United States Patent
Marchlewski et al.

(10) Patent No.: US 9,789,912 B1
(45) Date of Patent: Oct. 17, 2017

(54) VEHICLE TAILGATE STRUCTURE

(71) Applicant: FORD GLOBAL TECHNOLOGIES, LLC, Dearborn, MI (US)

(72) Inventors: Jack Marchlewski, Saline, MI (US); Jeffrey Gray, Dearborn, MI (US); Michael William Danyo, Trenton, MI (US); David Alan Hamilton, Dearborn, MI (US); Joshua R. Hemphill, White Lake, MI (US); John Comiez, Novi, MI (US); Colleen Marie Hoffman, Canton, MI (US); Scott Huneau, Pontiac, MI (US); Bradley Brandt, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/227,347

(22) Filed: Aug. 3, 2016

(51) Int. Cl.
*B62D 33/027* (2006.01)

(52) U.S. Cl.
CPC ....... *B62D 33/0273* (2013.01); *B62D 33/027* (2013.01)

(58) Field of Classification Search
CPC . B62D 33/023; B62D 33/027; B62D 33/0273
USPC .................................. 296/50, 57.1
See application file for complete search history.

(56) References Cited

U.S. PATENT DOCUMENTS

| | | | | |
|---|---|---|---|---|
| 5,947,540 A * | 9/1999 | Pariseau | ............. | B62D 33/023 296/146.6 |
| 6,951,357 B2 * | 10/2005 | Armstrong | ......... | B62D 33/0273 296/191 |
| 7,118,153 B2 * | 10/2006 | Kitayama | .......... | B62D 33/0273 296/146.12 |
| 7,213,859 B1 * | 5/2007 | Tan | .................... | B62D 33/0273 296/26.09 |
| 7,234,749 B1 * | 6/2007 | Firzlaff | .............. | B62D 33/0273 296/26.08 |
| 7,472,938 B2 * | 1/2009 | Firzlaff | .............. | B62D 33/0273 296/57.1 |
| 2003/0122401 A1 * | 7/2003 | Hashimoto | ........... | B60R 21/026 296/190.11 |
| 2004/0164580 A1 * | 8/2004 | Armstrong | ......... | B62D 33/0273 296/50 |
| 2005/0057064 A1 * | 3/2005 | Kitayama | .......... | B62D 33/0273 296/51 |
| 2005/0093324 A1 * | 5/2005 | Bruford | .................. | B60P 3/40 296/57.1 |

(Continued)

FOREIGN PATENT DOCUMENTS

| | | |
|---|---|---|
| CN | 205112948 U | 3/2016 |
| KR | 20130047033 A | 5/2013 |

*Primary Examiner* — Gregory Blankenship
(74) *Attorney, Agent, or Firm* — Jason Rogers; Brooks Kushman P.C.

(57) ABSTRACT

A vehicle tailgate includes an upper panel, lower panel, internal panel, external panel and brace. The upper and lower panels are spaced apart relative to each other. The internal and external panels are each secured to the upper and lower panels. A cavity is defined between the upper, lower, internal, and external panels. The brace is disposed within the cavity. The brace includes first and second flanges extending outward from a central plate. The first and second flanges are secured to the internal panel while the central plate is secured to the external panel.

20 Claims, 3 Drawing Sheets

(56) References Cited

U.S. PATENT DOCUMENTS

2014/0265414 A1\* 9/2014 Patterson ................ B60J 5/107
                                                                                296/50
2015/0375804 A1\* 12/2015 Gray ................... B62D 33/0273
                                                                                296/186.3

\* cited by examiner

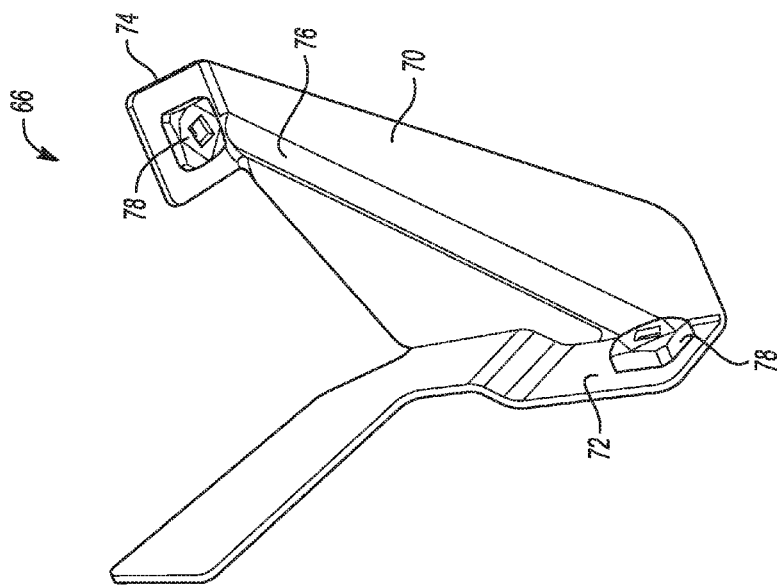
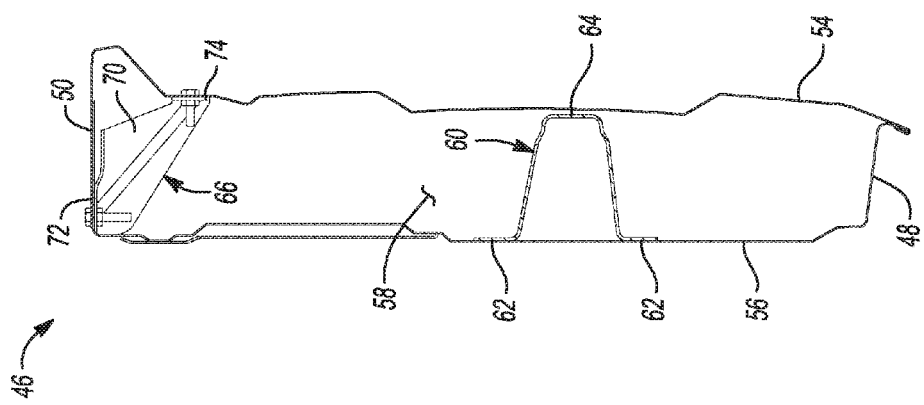

VEHICLE TAILGATE STRUCTURE

TECHNICAL FIELD

The present disclosure relates to tailgate structures for vehicles such as automobiles and trucks.

BACKGROUND

Automobiles, including trucks, may include tailgates that provide access to storage areas such as truck beds.

SUMMARY

A vehicle tailgate includes an upper panel, lower panel, internal panel, external panel, gusset, and V-shaped brace. The upper and lower panels are spaced apart from each other and extend in a transverse direction. The internal and external panels are each secured to the upper and lower panels. A cavity is defined between the upper, lower, internal, and external panels. The gusset is disposed within the cavity and is secured to both the upper and external panels. The V-shaped brace has a central plate, first flange, and second flange. The first and second flanges extend away from the central plate in opposing directions. The V-shaped brace is disposed within the cavity. The first flange is secured to the internal panel proximate the upper panel. The central plate is secured to the external panel. The second flange is secured to the internal panel between the upper and lower panels.

A vehicle tailgate includes an upper panel, lower panel, internal panel, external panel and brace. The upper and lower panels are spaced apart relative to each other. The internal and external panels are each secured to the upper and lower panels. A cavity is defined between the upper, lower, internal, and external panels. The brace is disposed within the cavity. The brace includes first and second flanges extending outward from a central plate. The first and second flanges are secured to the internal panel while the central plate is secured to the external panel.

A vehicle tailgate includes an upper panel, lower panel, internal panel, external panel and gusset. The upper and lower panels are spaced apart relative to each other. The internal and external panels are each secured to the upper and lower panels. A cavity is defined between the upper, lower, internal, and external panels. The gusset is disposed within the cavity and is secured to both the upper and external panels.

BRIEF DESCRIPTION OF THE DRAWINGS

FIG. 6 is a cross-sectional view taken along line 6-6 in FIG. 5;
and
FIG. 7 is an isometric view of a gusset.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicle users may stand or sit on a tailgate when in an up and/or shut condition. This can cause deflection in the outer panels of the tailgate when the tailgate is loaded with excessive weight. Additional stiffness within the tailgate may decrease the deflection of the outer panels.

Figure 1:
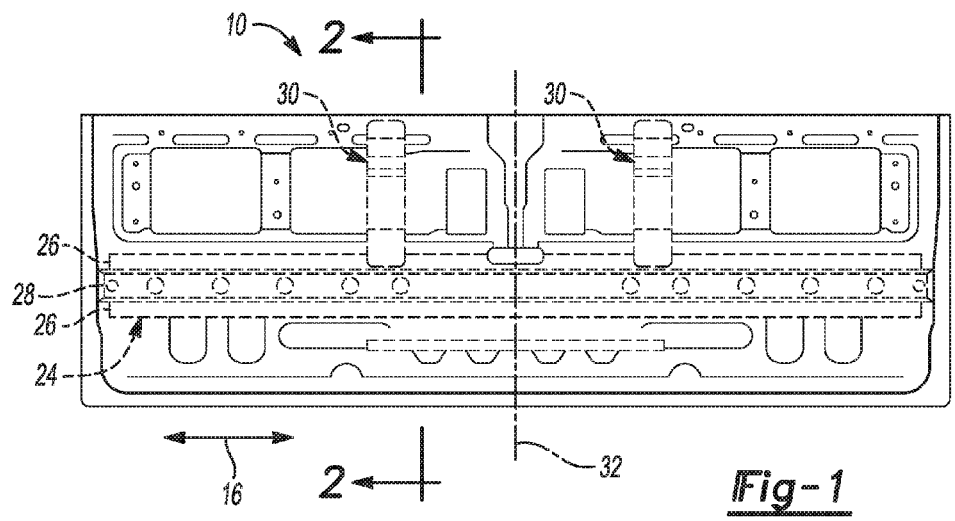
FIG. 1 is a front view of a first embodiment of a tailgate.
Figure 2:
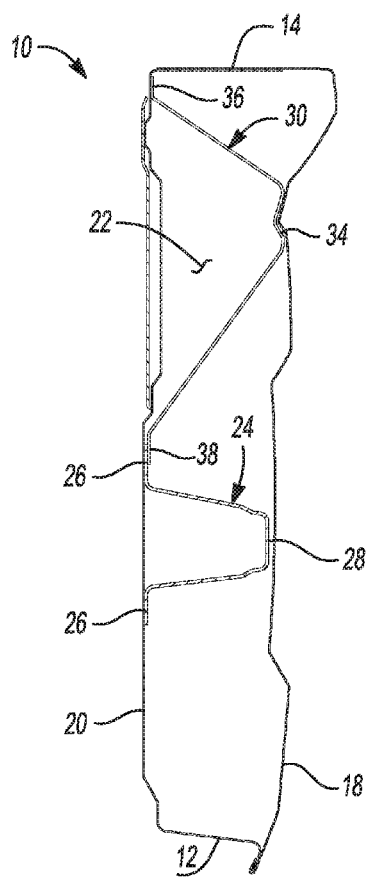
FIG. 2 is a cross-sectional view taken along line 2-2 in FIG. 1.

Referring to FIGS. 1 and 2, a first embodiment of a tailgate 10 is illustrated. The tailgate 10 may be a part of a vehicle such as an automobile or truck. The tailgate 10 includes a lower panel 12 and an upper panel 14. The lower panel 12 and the upper panel 14 are spaced apart relative to each other. The lower panel 12 and the upper panel 14 both extend in a transverse direction 16. The tailgate 10 also includes an external panel 18 and an internal panel 20. The external panel 18 and the internal panel 20 are each secured to both the lower panel 12 and the upper panel 14. A cavity 22 is defined between the lower panel 12, upper panel 14, external panel 18, and internal panel 20. A door handle may be disposed on the external panel 18. The door handle may be linked to a latch that locks the tailgate 10 in an up position. Pulling the door handle may unlock the latch, allowing the tailgate 10 to transition between the up position and a down position. The door handle may be connected to the latch by a series of linking mechanisms. The linking mechanisms and the latch may be disposed within the cavity 22. A support member 24 may be disposed within the cavity 22 between the lower panel 12 and the upper panel 14. The support member 24 may extend in the transverse direction 16. The support member 24 may be secured to both the external panel 18 and the internal panel 20. The support member 24 may include a pair of flanges 26 that extend from a central plate 28. The pair of flanges 26 may be secured to the internal panel 20 while the central plate 28 is secured to the external panel 18.

At least one V-shaped brace 30 may also be disposed within the cavity 22. The embodiment in FIG. 1 depicts two V-shaped braces 30 (which may be referred to as first and second V-shaped braces) that are disposed within the cavity 22 on opposing sides of a central location or axis 32 of the tailgate 10, relative to the transverse direction 16. Although FIG. 1 depicts two V-shaped braces 30, it should be understood that the tailgate 10 may include any number (one or more) of V-shaped braces 30 that may be disposed at any location within the cavity 22. Each of the V-shaped braces 30 include a central plate 34, first flange 36, and second flange 38. The first flange 36 and the second flange 38 may extend away from the central plate 34 in opposing directions. The first flange 36 may be secured to the internal panel 20 proximate to the upper panel 14. Proximate may refer to two components that are adjacent to each other. Proximate may also refer to two components that butt up against or come into contact with each other. Alternatively, the first flange 36 may be secured to the upper panel 14. The first flange 36 may conform to the shape or contour of the internal panel 20 or the upper panel 14 (depending on which component the first flange 36 is secured to). The second flange 38 may be secured to the internal panel 20 between the lower panel 12 and the upper panel 14. The second flange 38 may be secured to the internal panel 20 proximate to the support member 24. More specifically, the second flange 38 may be secured to one of the pair of flanges 26 of the support member 24 and therefore secured to the internal panel 20 via one of the pair of flanges 26. The second flange 38 may conform to the shape or contour of the internal panel 20 or one of the pair of flanges is 26 (depending on which component the second flange 38 is secured to). The central plate 34 may be secured to the external panel 18. More specifically, the central plate 34 may be secured to the external panel 18 between the lower panel 12 and the upper panel 14. The central plate 34 may conform to the shape or contour of the external panel 18.

The components of the tailgate 10 (including the lower panel 12, upper panel 14, external panel 18, internal panel 20, support member 24, and V-brace 30) that are secured to each other, as described above, may be secured to each other by welds, adhesive, fasteners, or by any other attachment mechanism known by a person of ordinary skill in the art. Some components may be integral to each other (e.g., two panels may be formed by bending a single sheet of material). Fasteners may include bolts, screws, rivets, or any other fastening mechanism known by a person of ordinary skill in the art.

The components of the tailgate 10 (including the lower panel 12, upper panel 14, external panel 18, internal panel 20, support member 24, and V-brace 30) may be made from any structural material including metals, plastics, or composite materials. Specific materials that the tailgate 10 components may be made from include aluminum alloys, steel, magnesium, fiber-reinforced plastics, or any other desirable structural material.

Figure 3:
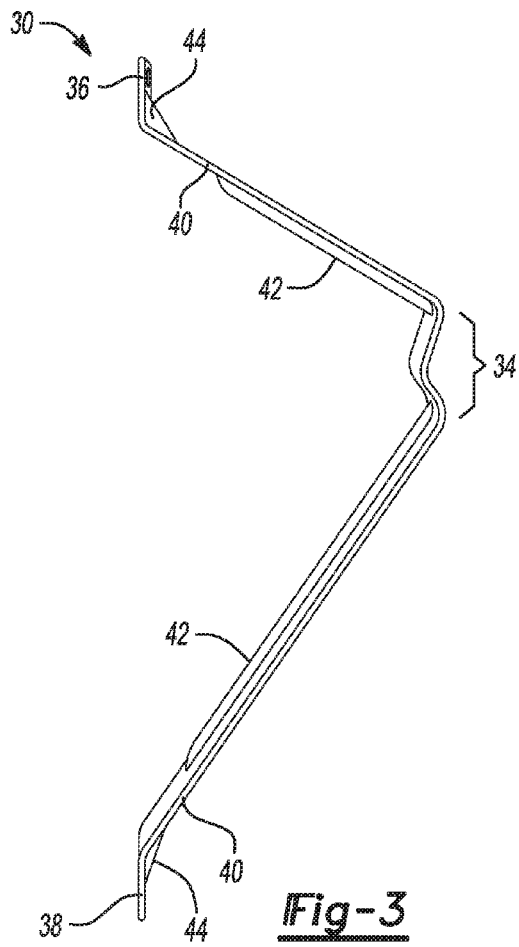
FIG. 3 is a rear view of a V-shaped brace.
Figure 4:
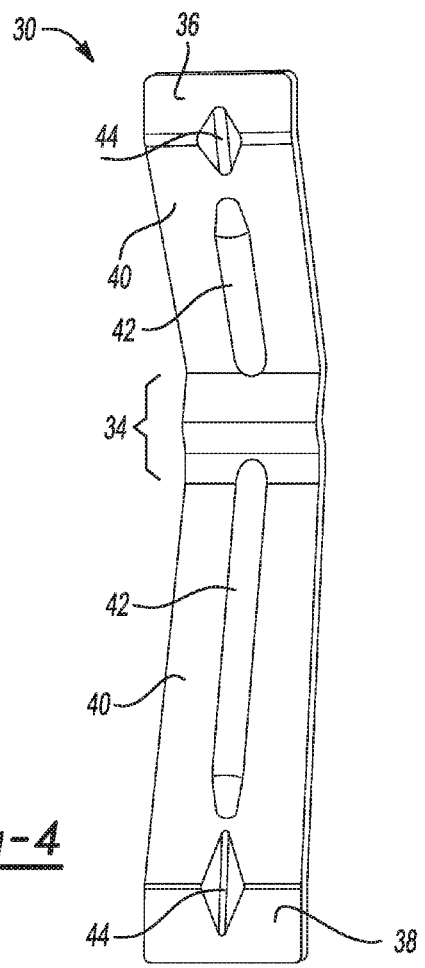
FIG. 4 is a side view of the V-shaped brace.

Referring to FIGS. 3 and 4, a V-brace 30 is illustrated. The V-brace 30 may include intermediate members 40 that connect the central plate 34 to the first flange 36 and the second flange 38. The V-brace 30 may include beads 42 and/or darts 44, which are small indentations within the material that comprises the V-brace 30. The beads 42 and/or darts 44 may increase the strength/stiffness of the V-brace 30. FIGS. 3 and 4 illustrate beads on the intermediate members and darts between the intermediate members and the flanges. It should be understood, however, that beads and/or darts may be positioned at any location on the V-brace 30.

Figure 5:
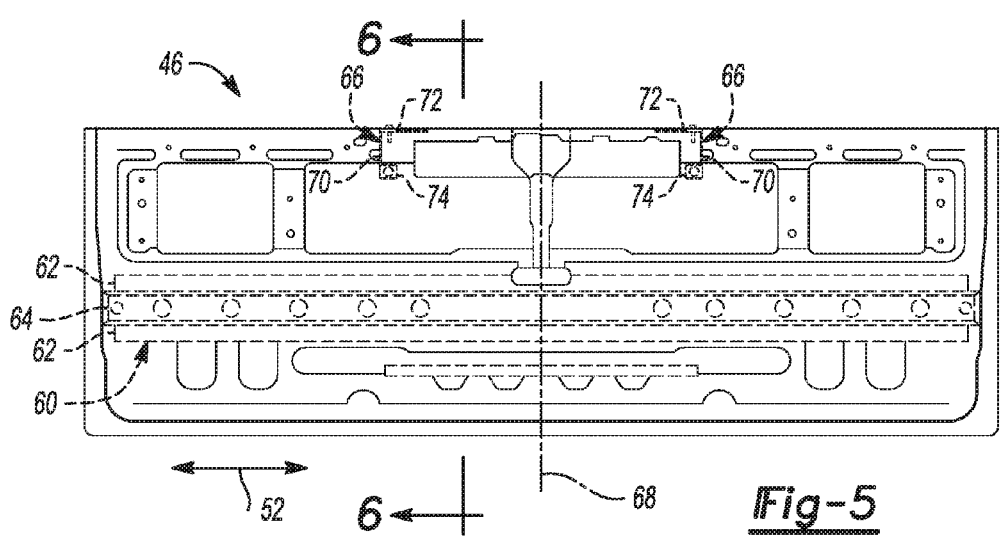
FIG. 5 is a front view of a second embodiment of a tailgate.

Referring to FIGS. 5 and 6, a second embodiment of a tailgate 46 is illustrated. The tailgate 46 may be a part of a vehicle such as an automobile or truck. The tailgate 46 includes a lower panel 48 and an upper panel 50. The lower panel 48 and the upper panel 50 are spaced apart relative to each other. The lower panel 48 and the upper panel 50 both extend in a transverse direction 52. The tailgate 46 also includes an external panel 54 and an internal panel 56. The external panel 54 and the internal panel 56 are each secured to both the lower panel 48 and the upper panel 50. A cavity 58 is defined between the lower panel 48, upper panel 50, external panel 54, and internal panel 56. A door handle may be disposed on the external 54 panel. The door handle may be linked to a latch that locks the tailgate 46 in an up position. Pulling the door handle may unlock the latch, allowing the tailgate 46 to transition between the up position and a down position. The door handle may be connected to the latch by a series of linking mechanisms. The linking mechanisms and the latch may be disposed within the cavity 58. A support member 60 may be disposed within the cavity 58 between the lower panel 48 and the upper panel 50. The support member 60 may extend in the transverse direction 52. The support member 60 may be secured to both the external panel 54 and the internal panel 56. The support member 60 may include a pair of flanges 62 that extend from a central plate 64. The pair of flanges 62 may be secured to the internal panel 56 while the central plate 64 is secured to the external panel 54.

At least one gusset 66 may also be disposed within the cavity 58. The embodiment in FIG. 5 depicts two gussets 66 (which may be referred to as first and second gussets) that are disposed within the cavity 58 on opposing sides of a central location or axis 68 of the tailgate 46, relative to the transverse direction 52. Although FIG. 5 depicts two gussets 66, it should be understood that the tailgate 46 may include any number (one or more) of gussets 66 which may be disposed at any location within the cavity 58. A gusset may be a flat, often triangular plate that is used to connect and reinforce a joint where several members meet at different angles. The gusset 66 may be secured to both the upper panel 50 and the external panel 54. Each of the gussets 66 may include a reinforcement plate 70. A first flange 72 may extend from the reinforcement plate at a first angle while a second flange 74 may extend from the reinforcement plate at a second angle. The first flange 72 of the gusset 66 may be secured to the upper panel 50 while the second flange 74 of the gusset 66 may be secured to the external panel 54. The first flange 72 may conform to the shape or contour of the upper panel 50 while the second flange 74 may conform to the shape or contour of the external panel 54.

The components of the tailgate 46 (including the lower panel 48, upper panel 50, external panel 54, internal panel 56, support member 60, and gusset 66) that are secured to each other, as described above, may be secured to each other by welds, adhesive, fasteners, or by any other attachment mechanism known by a person of ordinary skill in the art. Some components may be integral to each other (e.g., two panels may be formed by bending a single sheet of material). Fasteners may include bolts, screws, rivets, or any other fastening mechanism known by a person of ordinary skill in the art.

The components of the tailgate 46 (including the lower panel 48, upper panel 50, external panel 54, internal panel 56, support member 60, and gusset 66) may be made from any structural material including metals, plastics, or composite materials. Specific materials that the tailgate 46 components may be made from include aluminum alloys, steel, magnesium, fiber-reinforced plastics, or any other desirable structural material.

Referring to FIG. 7, a gusset 66 is illustrated. The gusset 66 may include beads 76 and/or darts (now shown) which are small indentations within the material that comprises the gusset 66. The beads 76 and/or darts may increase the strength/stiffness of the gusset 66. FIG. 7 illustrates beads on the reinforcement plate 70 of the gusset 66. It should be understood, however, that beads and/or darts may be positioned at any location on the gusset 66. The gusset 66 also includes nuts 78 that are secured to the gusset 66. The nuts 78 may be welded to the gusset 66. The nuts 78 may be configured to engage fasteners in order to secure the gusset 66 to the upper panel 50 and the external panel 54. Although FIG. 7 depicts nuts 78 that are secured to the gusset 66, the gusset may be secured to the upper panel 50 and the external panel 54 by any other method, as described above.

Additional embodiments may include both V-braces and gussets. The positions of the V-braces described in the first embodiment and the positions of the gussets described in the second embodiment may be adjusted to accommodate the presence of both V-braces and gussets. The additional embodiments may also include other structural members that may increase the strength and/or the stiffness of a tailgate.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle tailgate comprising:
   upper and lower spaced apart panels extending in a transverse direction;
   internal and external panels each secured to the upper and lower panels, and defining a cavity between the upper, lower, internal, and external panels, the external panel having a protrusion extending into the cavity;
   a first gusset disposed within the cavity, the first gusset having first and second flanges that are perpendicular to each other and are respectively secured to the upper and external panels; and
   a first V-shaped brace having a first central plate shaped to match a contour of the protrusion and having third and fourth flanges extending away from the first central plate in opposing directions, wherein the first V-shaped brace is disposed within the cavity, the third flange is secured to the internal panel proximate the upper panel, the first central plate is secured to the protrusion, and the fourth flange is secured to the internal panel between the upper and lower panels.

2. The vehicle tailgate of claim 1, further comprising a support member extending in the transverse direction, disposed within the cavity between the upper and lower panels, and secured to both the internal and external panels.

3. The vehicle tailgate of claim 2, wherein the support member includes a pair of flanges that are secured to the internal panel.

4. The vehicle tailgate of claim 3, wherein the fourth flange is secured to the internal panel via one of the pair of flanges.

5. The vehicle tailgate of claim 1, further comprising a second gusset disposed within the cavity and secured to both the upper and external panels.

6. The vehicle tailgate of claim 5, wherein the first and second gussets are disposed within the cavity on opposing sides of a central location of the tailgate relative to the transverse direction.

7. The vehicle tailgate of claim 1, further comprising a second V-shaped brace having a second central plate shaped to match the contour of the protrusion and fifth and sixth flanges extending away from the second central plate in opposing directions, wherein the second V-shaped brace is disposed within the cavity, the fifth flange is secured to the internal panel proximate the upper panel, the second central plate is secured to the protrusion, and the sixth flange is secured to the internal panel between the upper and lower panels.

8. The vehicle tailgate of claim 7, wherein the first and second V-shaped braces are disposed within the cavity on opposing sides of a central location of the tailgate relative to the transverse direction.

9. The vehicle tailgate of claim 1, wherein the first gusset includes a reinforcement plate, and the first and second flanges each extend from and are perpendicular to the reinforcement plate.

10. The vehicle tailgate of claim 1, wherein first and second weld nuts are secured to the first and second flanges, respectively, the first flange is secured to the upper panel via a first fastener that extends through the upper panel and engages the first weld nut, and the second flange is secured to the external panel via a second fastener that extends through the external panel and engages the second weld nut.

11. A vehicle tailgate comprising:
    internal and external panels each secured to upper and lower panels defining a cavity therebetween, the external panel having a protrusion extending into the cavity; and
    a brace disposed within the cavity, having first and second flanges extending outward from a central plate shaped to match a contour of the protrusion, wherein the flanges are secured to the internal panel and the central plate is secured to the protrusion.

12. The vehicle tailgate of claim 11, further comprising a gusset disposed within the cavity, the gusset having third and fourth flanges that are perpendicular to each other and are respectively secured to the upper and external panels.

13. The vehicle tailgate of claim 11, further comprising a support member disposed within the cavity between the upper and lower panels, and secured to both the internal and external panels.

14. The vehicle tailgate of claim 12, wherein the gusset includes a reinforcement plate, and the third and fourth flanges each extend from and are perpendicular to the reinforcement plate.

15. The vehicle tailgate of claim 12, wherein first and second weld nuts are secured to the third and fourth flanges, respectively, the third flange is secured to the upper panel via a first fastener that extends through the upper panel and engages the first weld nut, and the fourth flange is secured to the external panel via a second fastener that extends through the external panel and engages the second weld nut.

16. A vehicle tailgate comprising:
    internal and external panels each secured to upper and lower panels defining a cavity therebetween, and
    a first gusset disposed within the cavity, the first gusset including a reinforcement plate having first and second flanges extending therefrom, wherein the first and second flanges are each perpendicular to the reinforcement plate, perpendicular to each other, and are respectively secured to the upper and external panels.

17. The vehicle tailgate of claim 16, further comprising a second gusset disposed within the cavity and secured to both the upper and external panels.

18. The vehicle tailgate of claim 17, wherein the first and second gussets are disposed within the cavity on opposing sides of a central location of the tailgate.

19. The vehicle tailgate of claim 16, wherein the external panel has a protrusion extending into the cavity, and further comprising a brace disposed within the cavity, the brace having third and fourth flanges extending outward from a central plate shaped to match a contour of the protrusion, wherein the third and fourth flanges are secured to the internal panel and the central plate is secured to the protrusion.

20. The vehicle tailgate of claim 16, wherein first and second weld nuts are secured to the first and second flanges, respectively, the first flange is secured to the upper panel via a first fastener that extends through the upper panel and engages the first weld nut, and the second flange is secured to the external panel via a second fastener that extends through the external panel and engages the second weld nut.

\* \* \* \* \*